US010380782B2

(12) United States Patent
Liu et al.

(10) Patent No.: US 10,380,782 B2
(45) Date of Patent: Aug. 13, 2019

(54) METHOD FOR TRANSMITTING AND DISPLAYING OBJECT TRACKING INFORMATION AND SYSTEM THEREOF

(71) Applicant: VIVOTEK INC., New Taipei (TW)

(72) Inventors: Cheng-Chieh Liu, New Taipei (TW); Szu-Mo Chang, New Taipei (TW); Kuan-Yu Lin, New Taipei (TW)

(73) Assignee: VIVOTEK INC., New Taipei (TW)

( * ) Notice: Subject to any disclaimer, the term of this patent is extended or adjusted under 35 U.S.C. 154(b) by 143 days.

(21) Appl. No.: 15/427,032

(22) Filed: Feb. 7, 2017

(65) Prior Publication Data
US 2017/0272730 A1 Sep. 21, 2017

(30) Foreign Application Priority Data

Mar. 18, 2016 (TW) .............................. 105108477 A (51) Int. Cl.
*G06T 15/00* (2011.01)
*G06T 17/00* (2006.01)
(Continued)

(52) U.S. Cl.
CPC .............. *G06T 15/00* (2013.01); *G06T 17/00* (2013.01); *H04N 7/18* (2013.01); *H04N 2013/0081* (2013.01)

(58) Field of Classification Search
CPC ...... H04M 11/04; H04L 12/22; G08B 13/196; G08B 13/19684; G08B 13/08;
(Continued)

(56) References Cited

U.S. PATENT DOCUMENTS 4,241,456 A * 12/1980 Nakagaki .............. G08C 23/04
250/214 B
7,257,237 B1 * 8/2007 Luck ...................... A61B 5/1113
382/103
(Continued)

FOREIGN PATENT DOCUMENTS

TW 201237801 A1 9/2012
TW 201511566 A 3/2015
TW 201537137 A 10/2015

OTHER PUBLICATIONS

B. Leibe, K. Schindler, N. Cornelis, L. Van Gool, Coupled Object Detection and Tracking from Static Cameras and Moving Vehicles, IEEE Transactions on Pattern Analysis and Machine Intelligence, vol. 30, No. 10. (Oct. 2008), pp. 1683-1698, Jun. 27, 2008.
(Continued)

*Primary Examiner* — Frank F Huang
(74) *Attorney, Agent, or Firm* — Winston Hsu (57) ABSTRACT

A method for transmitting and displaying an object tracking information includes steps of capturing an image by a camera, wherein an object exists in the image; analyzing the image by the camera to obtain a 3D world coordinate information of the object; transmitting a projection matrix and the 3D world coordinate information to a display device by the camera; using the projection matrix to convert the 3D world coordinate information into a 2D image coordinate information by the display device; and displaying a pattern corresponding to the object according to the 2D image coordinate information by the display device.

12 Claims, 6 Drawing Sheets

(51) Int. Cl.
*H04N 7/18* (2006.01)
*H04N 13/00* (2018.01)

(58) Field of Classification Search
CPC ........ G08B 13/19663; G08B 13/19695; G08B 13/19667; G08B 29/046; G08B 17/125; G08B 13/19656; G08B 29/185; H04N 7/18; H04N 7/188; G06K 9/00771; G06K 2009/00738
See application file for complete search history.

(56) References Cited

U.S. PATENT DOCUMENTS

| | | | | |
|---|---|---|---|---|
| 9,064,394 | B1* | 6/2015 | Trundle | G08B 13/19684 |
| 2002/0034067 | A1* | 3/2002 | Massaro | A47F 5/0068 |
| | | | | 361/728 |
| 2003/0136832 | A1* | 7/2003 | Massaro | A47F 5/0068 |
| | | | | 235/383 |
| 2004/0195774 | A1* | 10/2004 | Segan | G04B 47/048 |
| | | | | 273/359 |
| 2007/0049159 | A1* | 3/2007 | Kulis, II | A63H 17/28 |
| | | | | 446/438 |
| 2007/0103890 | A1* | 5/2007 | Morehead | A01K 27/006 |
| | | | | 362/103 |
| 2007/0228755 | A1* | 10/2007 | Alvarado | B62D 41/00 |
| | | | | 296/1.07 |
| 2014/0247374 | A1* | 9/2014 | Murakami | H04N 5/23219 |
| | | | | 348/222.1 |

OTHER PUBLICATIONS

M. Munaro, F. Basso and E. Menegatti, Tracking people within groups with RGB-D data, IEEE/RSJ International Conference on Intelligent Robots and Systems, Oct. 7-12, 2012.

Myron Z. Brown et al., Advances in computational stereo, IEEE Transactions on Pattern Analysis and Machine Intelligence, vol. 25, Issue 8, Aug. 2003, pp. 993-1008.

* cited by examiner

METHOD FOR TRANSMITTING AND DISPLAYING OBJECT TRACKING INFORMATION AND SYSTEM THEREOF

CROSS REFERENCE TO RELATED APPLICATION

This application claims the benefit of Taiwan Application No. 105108477, which was filed on Mar. 18, 2016, and is incorporated herein by reference.

BACKGROUND OF THE INVENTION

1. Field of the Invention

The invention relates to a method for transmitting and displaying an object tracking information and a system thereof and, more particularly, to a method for transmitting and displaying an object tracking information and a system thereof capable of reducing data transmitting amount effectively.

2. Description of the Prior Art

At present, when a camera is used to track an object, the camera analyzes an image to obtain a 2D image coordinate information of the object in the image first and then transmits the 2D image coordinate information of the object to a display device, wherein the details may be referred to "ONVIF™ Analytics Service Specification" (http://www.onvif.org/specs/srv/analytics/ONVIF-An alytics-Service-Spec-v250.pdf). Then, the display device displays tracking information corresponding to the object in the image according to the 2D image coordinate information of the object. When the tracking information comprises shape, length, width, height and so on of the object, the camera has to transmit different 2D image coordinate information corresponding to different tracking information to the display device, such that the data transmitting amount will increase. The more the data transmitting amount is, the huger the system loading is. Consequently, the system performance will be influenced.

SUMMARY OF THE INVENTION

An objective of the invention is to provide a method for transmitting and displaying an object tracking information and a system thereof capable of reducing data transmitting amount effectively, so as to solve the aforesaid problems.

According to an embodiment of the invention, a method for transmitting and displaying an object tracking information comprises steps of capturing an image by a camera, wherein an object exists in the image; analyzing the image by the camera to obtain a 3D world coordinate information of the object; transmitting a projection matrix and the 3D world coordinate information to a display device by the camera; using the projection matrix to convert the 3D world coordinate information into a 2D image coordinate information by the display device; and displaying a pattern corresponding to the object according to the 2D image coordinate information by the display device.

According to another embodiment of the invention, a system for transmitting and displaying an object tracking information comprises a camera and a display device. The camera captures an image, wherein an object exists in the image. The camera analyzes the image to obtain a 3D world coordinate information of the object. The display device communicates with the camera. The camera transmits a projection matrix and the 3D world coordinate information to the display device. The display device uses the projection matrix to convert the 3D world coordinate information into a 2D image coordinate information. The display device displays a pattern corresponding to the object according to the 2D image coordinate information.

As mentioned in the above, after the camera captures the image, the camera analyzes the image to obtain the 3D world coordinate information of the object in real world first and then transmits the 3D world coordinate information of the object to the display device. Then, the display device uses the projection matrix of the camera to convert the 3D world coordinate information of the object into the 2D image coordinate information in the image. Accordingly, the display device can display the pattern corresponding to the object in the image according to the 2D image coordinate information, wherein the pattern is tracking information. Since the 2D image coordinate information is generated by the display device, the camera only needs to transmit the 3D world coordinate information of the object in real world to the display device. Accordingly, the invention can reduce the data transmitting amount substantially, so as to enhance system performance. Furthermore, since the 2D image coordinate information is generated by the display device, the display device can customize a display manner of the tracking information directly according to the 2D image coordinate information. Accordingly, the camera needs not to transmit different 2D image coordinate information in accordance with different tracking information to the display device.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
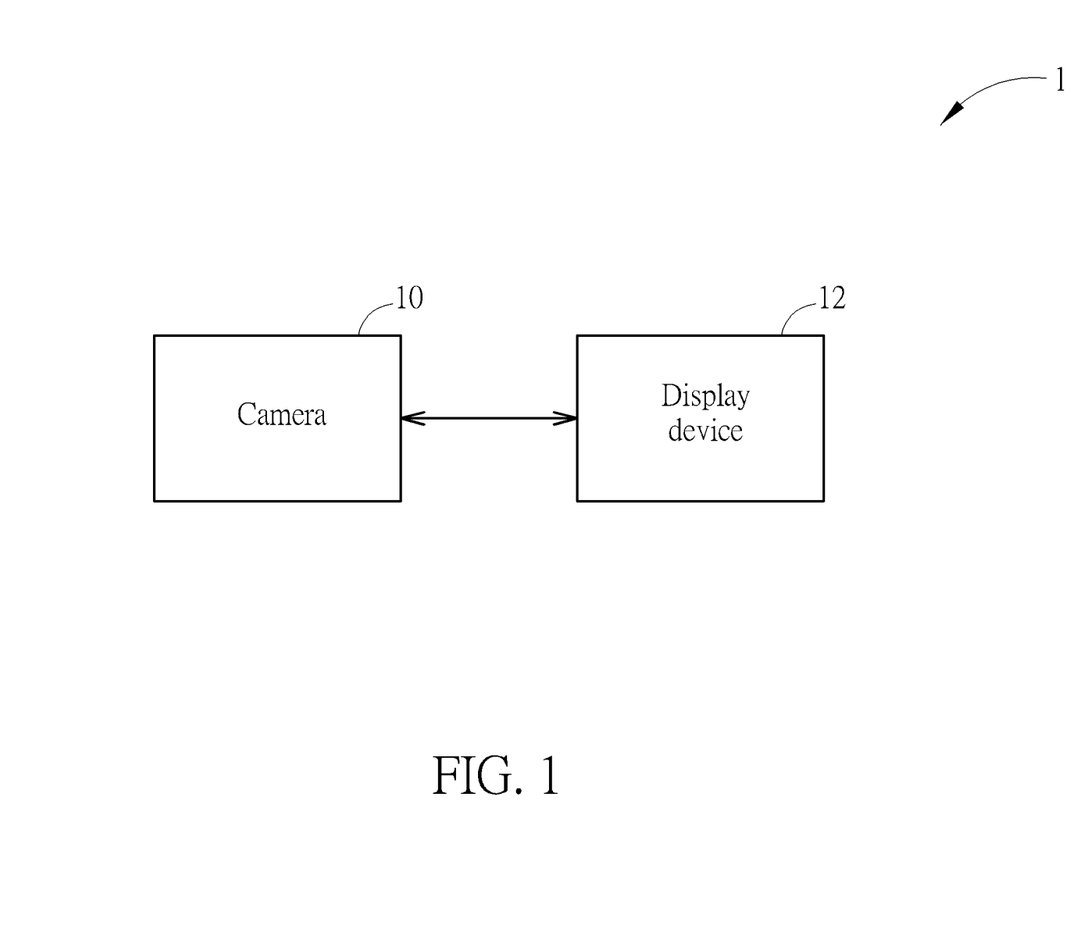
FIG. 1 is a functional block diagram illustrating a system for transmitting and displaying an object tracking information according to an embodiment of the invention.
Figure 2:
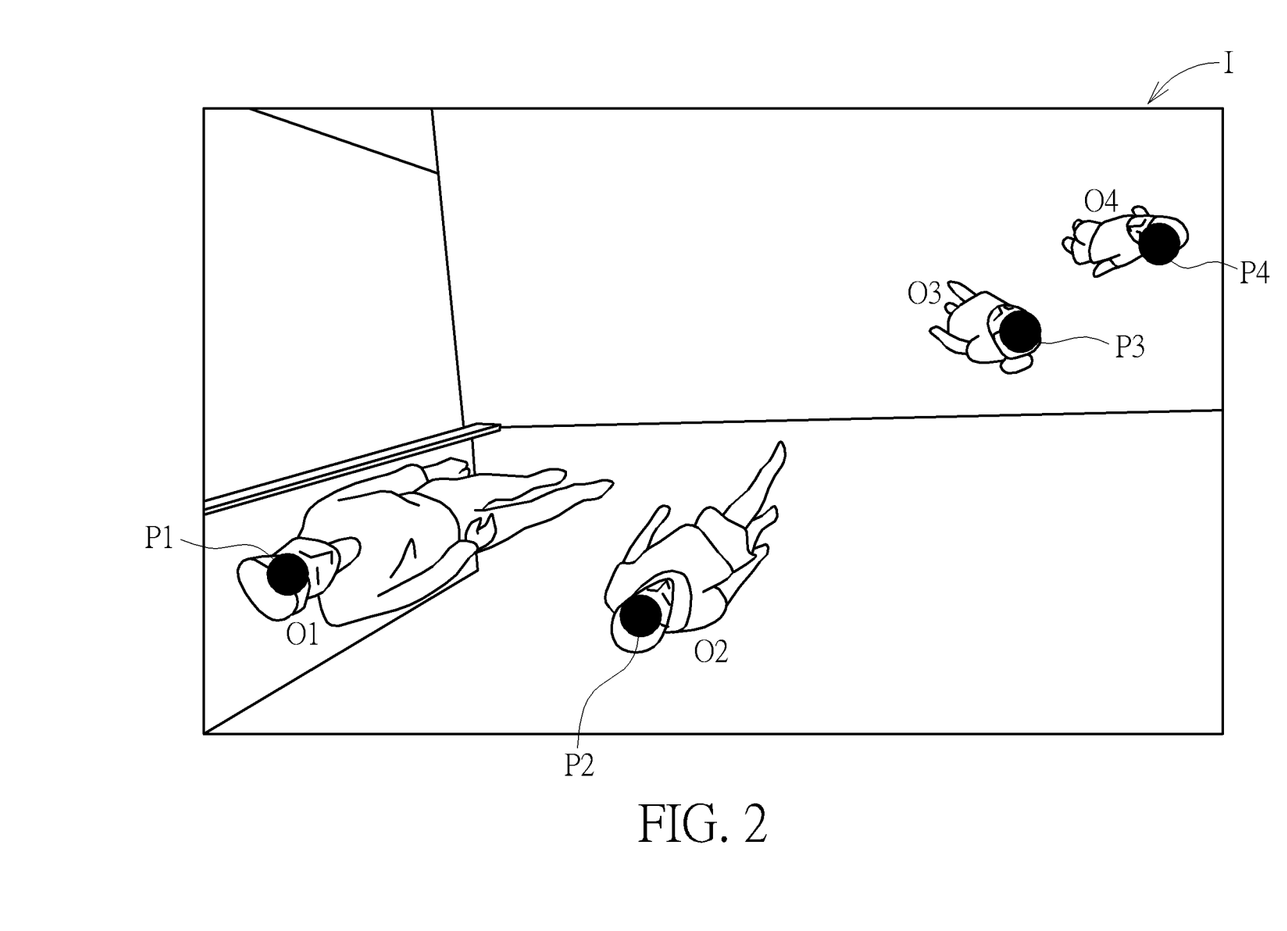
FIG. 2 is a schematic diagram illustrating an image captured by the camera shown in FIG. 1.
Figure 3:
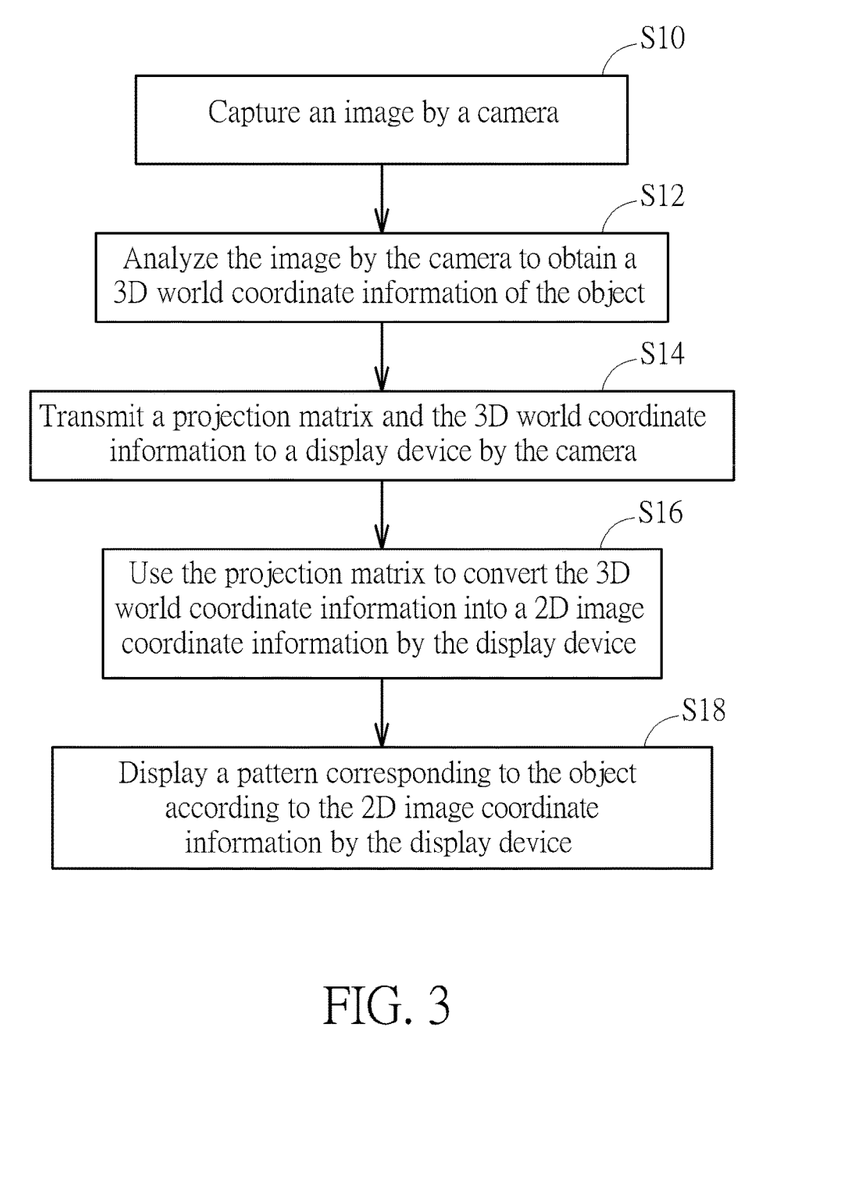
FIG. 3 is a flowchart illustrating a method for transmitting and displaying an object tracking information according to an embodiment of the invention.

Referring to FIGS. 1 to 3, FIG. 1 is a functional block diagram illustrating a system 1 for transmitting and displaying an object tracking information according to an embodiment of the invention, FIG. 2 is a schematic diagram illustrating an image I captured by the camera 10 shown in FIG. 1, and FIG. 3 is a flowchart illustrating a method for transmitting and displaying an object tracking information according to an embodiment of the invention. The method for transmitting and displaying an object tracking information shown in FIG. 3 is adapted to the system 1 for transmitting and displaying an object tracking information shown in FIG. 1.

As shown in FIG. 1, the system 1 for transmitting and displaying an object tracking information comprises a camera 10 and a display device 12, wherein the display device 12 communicates with the camera 10. In this embodiment, the camera 10 may be a stereo camera or a calibrated camera, and the display device 12 may be a computer screen, a monitor, a television, a tablet computer or other electronic devices with display function. In practical applications, the display device 12 may communicate with the camera 10 by wired or wireless manner. A communication network between the display device 12 and the camera 10 may be a local area network or Internet.

When the system 1 is used for transmitting and displaying an object tracking information, first of all, the camera 10 captures an image I (step S10 in FIG. 3). As shown in FIG. 2, a plurality of objects O1-O4 exists in the image I. It should be noted that the number of the objects existing in the image I may be one or more, so the invention is not limited to the embodiment shown in FIG. 2. Furthermore, the objects O1-O4 shown in FIG. 2 are persons for illustration purpose only. In another embodiment, the object existing in the image I may also be a vehicle, an animal or other objects.

Then, the camera 10 analyzes the image I to obtain 3D world coordinate information of the objects O1-O4 (step S12 in FIG. 3). The aforesaid 3D world coordinate information is 3D world coordinate information of the objects O1-O4 in real world, wherein the 3D world coordinate information may comprise position coordinates of the objects O1-O4 (e.g. a coordinate of a point at a foot of the object or a coordinate of a point at a head of the object) and/or heights of the objects O1-O4 (e.g. a number). It should be noted that how to obtain the aforesaid 3D world coordinate information is well known by one skilled in the art and the details may be referred to "Leibe, K. Schindler, N. Cornelis, L. Van Gool, "Coupled Object Detection and Tracking from Static Cameras and Moving Vehicles" Pattern Analysis and Machine Intelligence, IEEE Transactions on, Vol. 30, No. 10. (October 2008), pp. 1683-1698 and M. Munaro, F. Basso and E. Menegatti. "Tracking people within groups with RGB-D data". Proceedings of the International Conference on Intelligent Robots and Systems (IROS) 2012", so it will not be depicted in detail herein.

Then, the camera 10 transmits a projection matrix, the image I and the 3D world coordinate information of the objects O1-O4 to the display device 12 (step S14 in FIG. 3). Referring to the following equation 1, $P_{3\times4}$ represents the projection matrix of the camera 10, (x, y, w) represents a 2D homogeneous coordinate, and (X, Y, Z, T) represents a 3D homogeneous coordinate.

$$\begin{pmatrix} x \\ y \\ w \end{pmatrix} = P_{3\times4} \begin{pmatrix} X \\ Y \\ Z \\ T \end{pmatrix}. \quad \text{Equation 1}$$

In equation 1, X, Y and Z of (X, Y, Z, T) are 3D world coordinate in real world (the camera 10 is at origin), and x and y of (x, y, w) are 2D image coordinate in the image I. Furthermore, T of (X, Y, Z, T) and w of (x, y, w) are scaling factors for homogeneous coordinate. In homogeneous coordinate, after multiplying one coordinate by one scaling factor, it is still corresponding to the same point. For example, (1, 2, 3, 1) and (2, 4, 6, 2) represent the same point. How the camera calculates the projection matrix itself and the related application of the projection matrix may be referred to "Richard Hartley and Andrew Zisserman, "Multiple View Geometry in Computer Vision", Second Edition, Cambridge University Press, March 2004".

Then, the display device 12 uses the projection matrix to convert the 3D world coordinate information of the objects O1-O4 in real world into 2D image coordinate information of the objects O1-O4 in the image I according to equation 1 (step S16 in FIG. 3). It should be noted that the camera 10 only needs to transmit the projection matrix to the display device 12 once and then the display device 12 can repeatedly use the projection matrix to convert the 3D world coordinate information in real world into the 2D image coordinate information in the image I.

Finally, the display device 12 displays the image I and displays patterns P1-P4 corresponding to the objects O1-O4 in the image I according to the 2D image coordinate information (step S18 in FIG. 3), wherein the patterns P1-P4 are tracking information. The patterns P1-P4 shown in FIG. 2 are circular and identical. However, the invention may also display the patterns P1-P4 with different shapes (e.g. rectangle, circle, triangle, polygon, etc.), such that a user can recognize the objects O1-O4 easily. Furthermore, in this embodiment, the display device 12 displays the patterns P1-P4 on tops (e.g. head) of the objects O1-O4. In another embodiment, the display device 12 may display the patterns P1-P4 on bottoms (e.g. foot) of the objects O1-O4. In other words, the display device 12 may selectively display the patterns P1-P4 on tops or bottoms of the objects according to practical applications. Needless to say, the invention may also display the patterns P1-P4 around the objects O1-O4.

Figure 4:
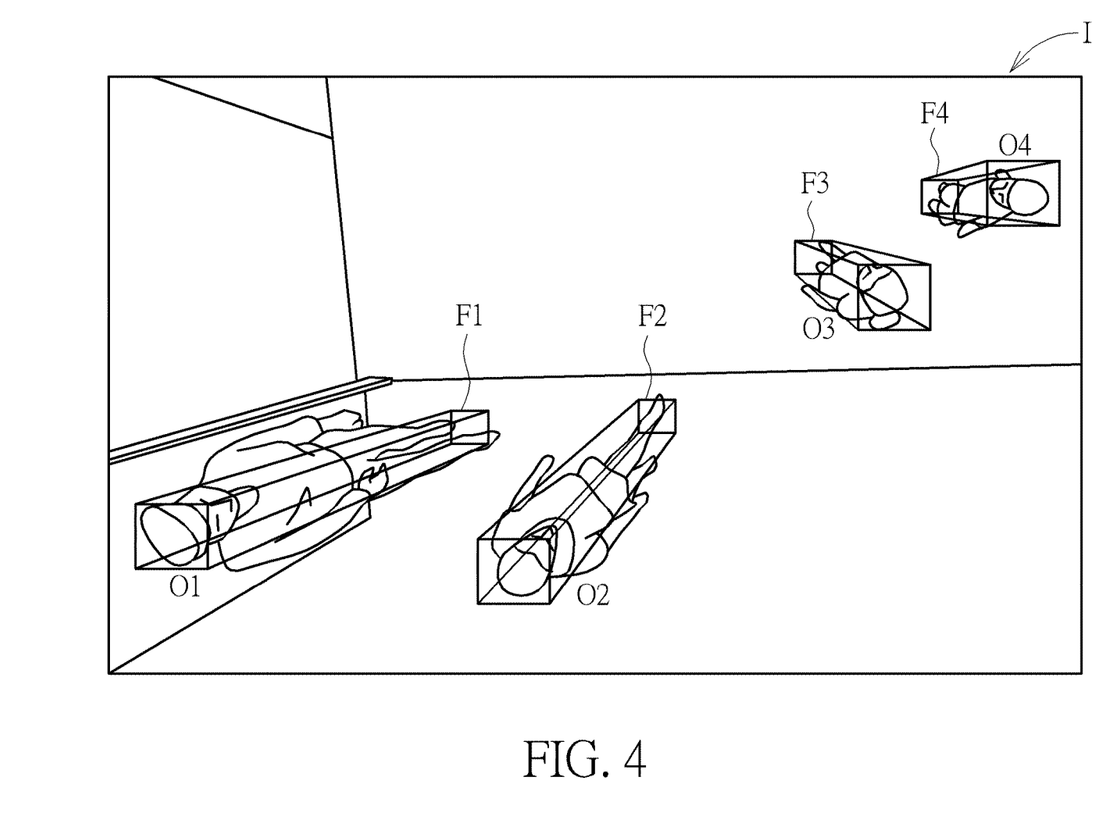
FIG. 4 is a schematic diagram illustrating frames used as tracking information of the objects.

Referring to FIG. 4, FIG. 4 is a schematic diagram illustrating frames F1-F4 used as tracking information of the objects O1-O4. As shown in FIG. 4, after obtaining the 2D image coordinate information of the objects O1-O4 in the image I, the display device 12 may expand the 2D image coordinate information into frames F1-F4 with a predetermined real length, so as to use the frames F1-F4 as tracking information of the objects O1-O4. The aforesaid predetermined real length may be an average body width and/or thickness of a person (e.g. 24 cm) or other values. In this embodiment, the frames F1-F4 are cubic. Since the 2D image coordinate information and heights of the objects O1-O4 are known, the invention may expand the 2D image coordinate information of the objects O1-O4 in all directions with the aforesaid predetermined real length and use the heights of the objects O1-O4 as the heights of the frames F1-F4, so as to obtain the frames F1-F4 shown in FIG. 4.

In the prior art, to obtain the frames F1-F4 shown in FIG. 4, the camera has to transmit eight coordinates of eight end points of each frame to the display device. However, in the invention, the camera only needs to transmit the position coordinate (one point) and the height (one number) of each object O1-O4 to the display device and then the display device can obtain the frames F1-F4 shown in FIG. 4 according to the aforesaid manner. Accordingly, the invention can reduce the data transmitting amount substantially, so as to enhance system performance.

In another embodiment, when the number of the objects in the image is larger than or equal to a predetermined number, the invention may display the patterns P1-P4 shown in FIG. 2 on the objects; and when the number of the objects in the image is smaller than the predetermined number, the invention may display the frames F1-F4 shown in FIG. 4 on the objects.

Figure 5:
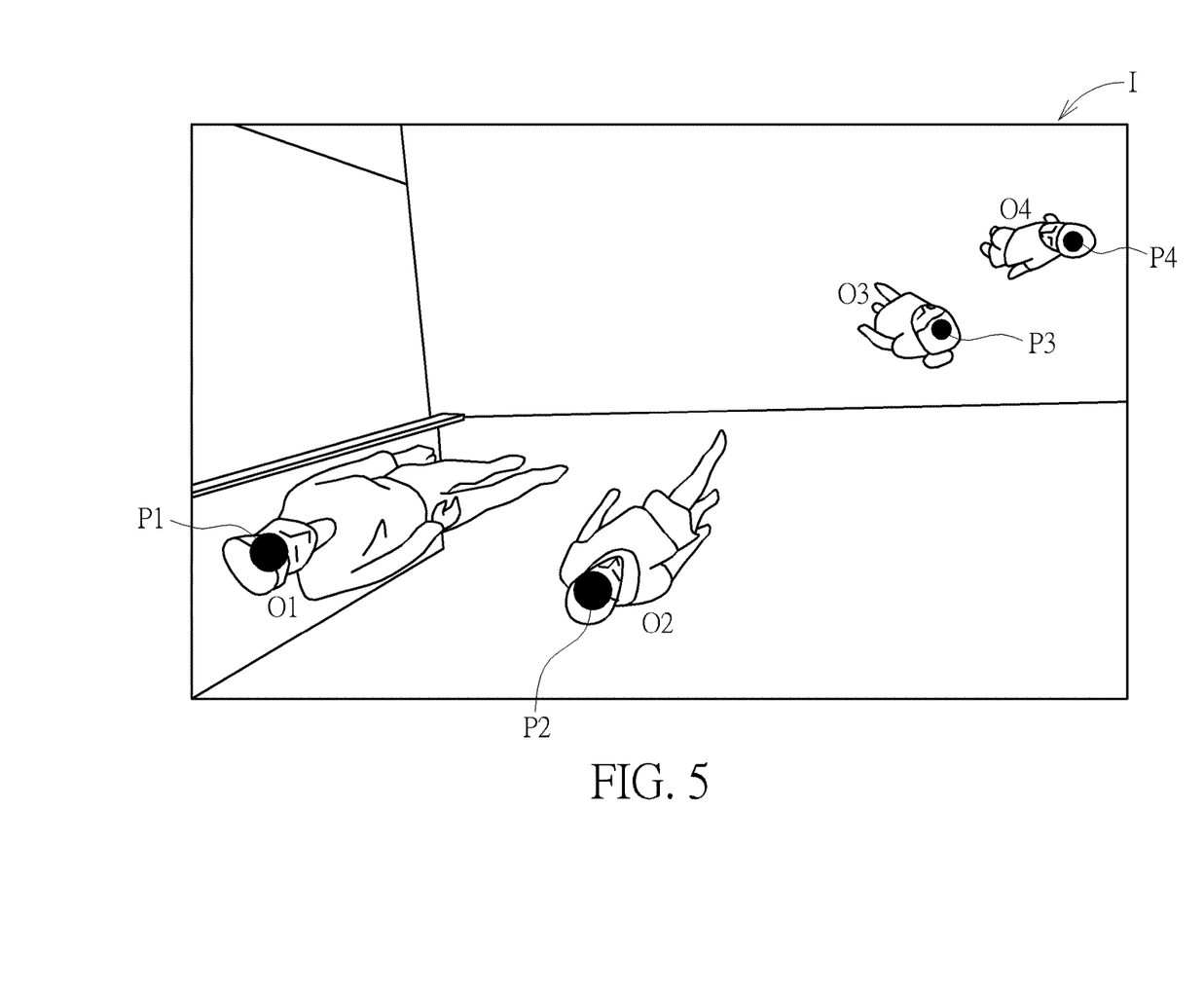
FIG. 5 is a schematic diagram illustrating the patterns of tracking information with different sizes.

Referring to FIG. 5, FIG. 5 is a schematic diagram illustrating the patterns P1-P4 of tracking information with different sizes. When the 3D world coordinate information transmitted by the camera 10 to the display device 12 comprises heights of the objects O1-O4, the invention may further display the patterns P1-P4 with different sizes according to the heights of the objects O1-O4. When the height of the object is larger than or equal to a predetermined height, the display device 12 may display the pattern with a first size; and when the height of the object is smaller than the predetermined height, the display device 12 may display the pattern with a second size, wherein the second size is smaller than the first size. For example, the aforesaid predetermined height may be set as a criterion for determining that the object is an adult or a child, e.g. 140 cm. As shown in FIG. 5, the objects O1-O2 are adults and the objects O3-O4 are children, so the heights of the objects O1-O2 are larger than or equal to the predetermined height and the heights of the objects O3-O4 are smaller than the predetermined height. At this time, the display device 12 will display the patterns P1-P2 with larger first size and display the patterns P3-P4 with smaller second size. Accordingly, the user can know that which one of the objects O1-O4 is an adult or a child according to the sizes of the patterns P1-P4.

Figure 6:
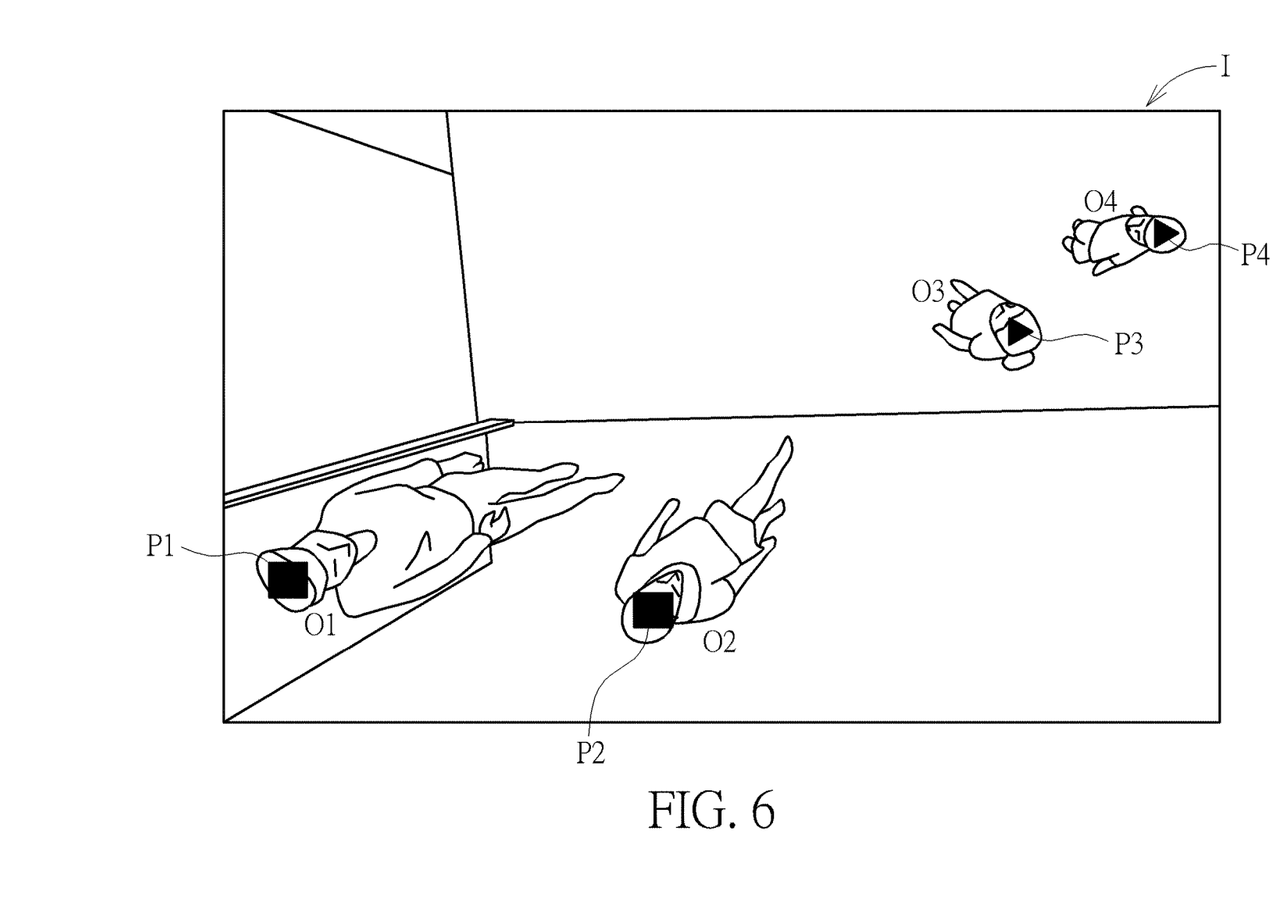
FIG. 6 is a schematic diagram illustrating the patterns of tracking information with different shapes.

Referring to FIG. 6, FIG. 6 is a schematic diagram illustrating the patterns P1-P4 of tracking information with different shapes. When the 3D world coordinate information transmitted by the camera 10 to the display device 12 comprises heights of the objects O1-O4, the invention may further display the patterns P1-P4 with different shapes according to the heights of the objects O1-O4. When the height of the object is larger than or equal to a predetermined height, the display device 12 may display the pattern with a first shape; and when the height of the object is smaller than the predetermined height, the display device 12 may display the pattern with a second shape, wherein the second shape is different from the first shape. For example, the aforesaid predetermined height may be set as a criterion for determining that the object is an adult or a child, e.g. 140 cm. As shown in FIG. 6, the objects O1-O2 are adults and the objects O3-O4 are children, so the heights of the objects O1-O2 are larger than or equal to the predetermined height and the heights of the objects O3-O4 are smaller than the predetermined height. At this time, the display device 12 will display the patterns P1-P2 with first shape (e.g. rectangle) and display the patterns P3-P4 with second shape (e.g. triangle). Accordingly, the user can know that which one of the objects O1-O4 is an adult or a child according to the shapes of the patterns P1-P4.

Moreover, when the 3D world coordinate information transmitted by the camera 10 to the display device 12 comprises heights of the objects O1-O4, the invention may further display the patterns P1-P4 with different sizes and shapes according to the heights of the objects O1-O4. When the height of the object is larger than or equal to a predetermined height, the display device 12 may display the pattern with a first size and a first shape; and when the height of the object is smaller than the predetermined height, the display device 12 may display the pattern with a second size and a second shape, wherein the second size is smaller than the first size and the second shape is different from the first shape. For example, the aforesaid predetermined height may be set as a criterion for determining that the object is an adult or a child, e.g. 140 cm. Accordingly, the user can know that which one of the objects O1-O4 is an adult or a child according to the sizes and the shapes of the patterns P1-P4.

It should be noted that the control logic of the method for transmitting and displaying an object tracking information of the invention can be implemented by software. The software can be executed in a system comprising a camera and a display device. Needless to say, each part or function of the control logic may be implemented by software, hardware or the combination thereof.

As mentioned in the above, after the camera captures the image, the camera analyzes the image to obtain the 3D world coordinate information of the object in real world first and then transmits the 3D world coordinate information of the object to the display device. Then, the display device uses the projection matrix of the camera to convert the 3D world coordinate information of the object into the 2D image coordinate information in the image. Accordingly, the display device can display the pattern corresponding to the object in the image according to the 2D image coordinate information, wherein the pattern is tracking information. Since the 2D image coordinate information is generated by the display device, the camera only needs to transmit the 3D world coordinate information of the object in real world to the display device. Accordingly, the invention can reduce the data transmitting amount substantially, so as to enhance system performance. Furthermore, since the 2D image coordinate information is generated by the display device, the display device can customize a display manner of the tracking information directly according to the 2D image coordinate information. Accordingly, the camera needs not to transmit different 2D image coordinate information in accordance with different tracking information to the display device.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for transmitting and displaying an object tracking information comprising steps of:

capturing an image by a camera, wherein an object exists in the image;

analyzing the image by the camera to obtain a 3D world coordinate information of the object;

transmitting a projection matrix and the 3D world coordinate information to a display device by the camera;

using the projection matrix to convert the 3D world coordinate information into a 2D image coordinate information by the display device through $$\begin{pmatrix} x \\ y \\ w \end{pmatrix} = P_{3 \times 4} \begin{pmatrix} X \\ Y \\ Z \\ T \end{pmatrix},$$

wherein $P_{3 \times 4}$ represents the projection matrix of the camera, (x, y, w) represents a 2D homogeneous coordinate, and (X, Y, Z, T) represents a 3D homogeneous coordinate, X, Y and Z of (X, Y, Z, T) are the 3D world coordinate information, x and y of (x, y, w) are the 2D image coordinate information, and T of (X, Y, Z, T) and w of (x, y, w) are scaling factors for homogeneous coordinate; and displaying a pattern corresponding to the object according to the 2D image coordinate information by the display device.

2. The method of claim 1, further comprising step of:
expanding the 2D image coordinate information into a frame with a predetermined real length by the display device.

3. The method of claim 1, further comprising step of:
displaying the pattern on a top or a bottom of the object by the display device.

4. The method of claim 1, wherein the 3D world coordinate information comprises a height of the object and the method further comprises steps of:
when the height is larger than or equal to a predetermined height, displaying the pattern with a first size by the display device; and
when the height is smaller than the predetermined height, displaying the pattern with a second size by the display device, wherein the second size is smaller than the first size.

5. The method of claim 1, wherein the 3D world coordinate information comprises a height of the object and the method further comprises steps of:
when the height is larger than or equal to a predetermined height, displaying the pattern with a first shape by the display device; and
when the height is smaller than the predetermined height, displaying the pattern with a second shape by the display device, wherein the second shape is different from the first shape.

6. The method of claim 1, further comprising step of:
transmitting the image to the display device by the camera; and
displaying the image by the display device;
wherein the pattern is displayed on the image.

7. A system for transmitting and displaying an object tracking information comprising:
a camera capturing an image, an object existing in the image, the camera analyzing the image to obtain a 3D world coordinate information of the object; and
a display device communicating with the camera, the camera transmitting a projection matrix and the 3D world coordinate information to the display device, the display device using the projection matrix to convert the 3D world coordinate information into a 2D image coordinate information through $$\begin{pmatrix} x \\ y \\ w \end{pmatrix} = P_{3 \times 4} \begin{pmatrix} X \\ Y \\ Z \\ T \end{pmatrix},$$

wherein $P_{3\times 4}$ represents the projection matrix of the camera, (x, y, w) represents a 2D homogeneous coordinate, and (X, Y, Z, T) represents a 3D homogeneous coordinate, X, Y and Z of (X, Y, Z, T) are the 3D world coordinate information, x and y of (x, y, w) are the 2D image coordinate information, and T of (X, Y, Z, T) and w of (x, y, w) are scaling factors for homogeneous coordinate, the display device displaying a pattern corresponding to the object according to the 2D image coordinate information.

8. The system of claim 7, wherein the display device expands the 2D image coordinate information into a frame with a predetermined real length.

9. The system of claim 7, wherein the display device displays the pattern on a top or a bottom of the object.

10. The system of claim 7, wherein the 3D world coordinate information comprises a height of the object; when the height is larger than or equal to a predetermined height, the display device displays the pattern with a first size; when the height is smaller than the predetermined height, the display device displays the pattern with a second size; and the second size is smaller than the first size.

11. The system of claim 7, wherein the 3D world coordinate information comprises a height of the object; when the height is larger than or equal to a predetermined height, the display device displays the pattern with a first shape; when the height is smaller than the predetermined height, the display device displays the pattern with a second shape; and the second shape is different from the first shape.

12. The system of claim 7, wherein the camera transmits the image to the display device, the display device displays the image, and the display device displays the pattern on the image.

* * * * *